US012746683B2

(12) United States Patent
Gearheart et al.

(10) Patent No.: US 12,746,683 B2
(45) Date of Patent: Sep. 29, 2026

(54) DISTANCE-BASED LED POWER MODULATION IN SURGICAL TRACKING SYSTEM

(71) Applicant: DEPUY IRELAND UNLIMITED COMPANY, County Cork (IE)

(72) Inventors: John Gearheart, Sharon, MA (US); Allen Davila, Waltham, MA (US); Monique Dubois, Cambridge, MA (US); William Quere, Grenoble (FR)

(73) Assignee: DEPUY IRELAND UNLIMITED COMPANY, County Cork (IE)

( * ) Notice: Subject to any disclaimer, the term of this patent is extended or adjusted under 35 U.S.C. 154(b) by 151 days.

(21) Appl. No.: 18/632,016

(22) Filed: Apr. 10, 2024

(65) Prior Publication Data

US 2025/0319603 A1 Oct. 16, 2025

(51) Int. Cl.

*B25J 9/16* (2006.01)
*B25J 19/02* (2006.01)
*B25J 19/04* (2006.01)

(52) U.S. Cl.

CPC ............. *B25J 9/1697* (2013.01); *B25J 9/161* (2013.01); *B25J 19/023* (2013.01); *B25J 19/04* (2013.01)

(58) Field of Classification Search

CPC ........ B25J 9/1697; B25J 9/161; B25J 19/023; B25J 19/04; A61B 34/20; A61B 90/00; A61B 90/39; H05B 45/00

See application file for complete search history.

(56) References Cited

U.S. PATENT DOCUMENTS

| | | | | |
|---|---|---|---|---|
| 11,980,425 | B2 * | 5/2024 | Ghanam | A61B 34/20 |
| 2020/0198147 | A1 * | 6/2020 | Fredrickson | B25J 9/0084 |
| 2022/0362944 | A1 * | 11/2022 | Zamani | B25J 13/00 |

* cited by examiner

*Primary Examiner* — Daniel D Chang

(74) *Attorney, Agent, or Firm* — Kramer & Amado, P.C.

(57) ABSTRACT

A tracking array tracking system includes a tracking sensor, a position determination logic block coupled to the tracking sensor, and a robotic device controller coupled to the position determination logic block, a tracking array including a plurality of light sources, and a power module coupled to the tracking array, the power module including one or more variable current sources, and the robotic device controller is communicatively coupled to the power module. Together, the tracking sensor, position determination logic block, and robotic device controller, determine changes in distance of the light sources from the tracking sensor and command the power module to increase or decrease the drive current to a light source if the light source has moved away from, or closer to, the tracking sensor, respectively.

10 Claims, 8 Drawing Sheets

DISTANCE-BASED LED POWER MODULATION IN SURGICAL TRACKING SYSTEM

FIELD OF THE DISCLOSURE

Various illustrative embodiments disclosed herein relate generally to power modulation in advanced tracking arrays for use in computer-aided surgery (CAS).

BACKGROUND

Tracking arrays are used in computer-aided surgery to track the location of the patient, surgical tools, and in some cases surgical robots. A camera system provides the ability to determine the location of the tracking arrays relative to one another. This location information may then be used by a surgeon carrying out the computer-aided surgery.

SUMMARY

Various illustrative embodiments relate to changing the drive current of illumination sources disposed on a tracking array.

In one illustrative embodiment, a tracking array tracking system includes a navigation station, which itself includes a tracking sensor, and a position determination logic block coupled to the tracking sensor, and a robotic device, which itself includes a tracking array including one or more markers, and a power module coupled to the tracking array, the power module including one or more variable current sources, and a robotic device controller coupled to the position determination logic block, wherein the robotic device controller is communicatively coupled to the power module of the robotic device, the one or more markers are coupled to the corresponding plurality of variable current sources, the power module further includes current-control logic coupled to the one or more variable current sources, and the current-control logic is configured to control, responsive to power modulation control signals received from the robotic device controller, an amount of drive current that is output by each variable current source of the one or more variable current sources.

In some embodiments, the amount of drive current that is output by each variable current source is based, at least in part, on the distance of each corresponding marker from the tracking sensor.

In some embodiments, the one or more markers includes a corresponding plurality of light-emitting diodes (LEDs), and the brightness of each LED is related to the amount of drive current provided to each LED respectively.

In some embodiments, the tracking array further includes a mount, and a body coupled to the mount, wherein the body has a triangular shape.

In some embodiments, the tracking array further includes a mount, and a body coupled to the mount, wherein the body has a rectangular shape.

In some embodiments, the tracking sensor comprises a spatial camera.

In some embodiments, the position determination logic block is configured to provide the position of the robotic device to the robotic device controller based, at least in part, on a plurality of stored observations by the tracking sensor of light emitted by the tracking array.

In some embodiments, the position determination logic comprises a processor.

In some embodiments, the robotic device controller is configured to share the processor with the position determination logic block.

In some embodiments, the first LEDs and the second LEDs are infrared LEDs.

In another illustrative embodiment, a method in accordance with this disclosure includes providing a plurality of light sources, providing a tracking sensor configured to detect light from the plurality of light sources, detecting, by the tracking sensor, light from each light source of the plurality of light sources, determining a present-distance value of each light source, of the plurality of light sources, from the tracking sensor, determining, for each light source, whether its present-distance value is greater than or less than a previous-distance value associated with that light source, increasing a drive current for each light source having a present-distance value that is greater than its previous-distance value, wherein a magnitude of the increase in drive current for each of these light sources is based, at least in part, on the difference between its present-distance value and its previous-distance value, and decreasing the drive current for each light source having a present-distance value that is less than its previous-distance value, wherein a magnitude of the decrease in drive current for each of these light sources is based, at least in part, on the difference between its present-distance value and its previous-distance value.

In some embodiments, each light source is disposed on a tracking array, and each light source comprises an LED.

In some embodiments, detecting light from each light source of the plurality of light sources includes receiving infrared light, wherein the tracking sensor includes a spatial camera, and wherein each light source of the plurality of light sources may be an infrared LED.

In some embodiments, the method further includes determining an initial distance of each light source of the plurality of light sources from the tracking sensor, and storing, in a previous-distance storage, the initial distance of each light source from the tracking sensor as the corresponding previous-distance value associated with each light source.

In some embodiments, the method further includes storing the present-distance value of each light source as the previous-distance value of that light source prior to updating the present-value storage with a newly-detected-present-distance value.

In a further illustrative embodiment, a method for modulating drive current for an active illumination tracking array in a computer-aided surgery system includes detecting a change in position of an LED-based tracking array of a robotic device, determining based, at least in part, on the detected change in position, a distance between a first LED of the LED-based tracking array and a tracking sensor of a navigation station, increasing the drive current to the first LED if the change in position of the LED-based tracking array increased the distance between the first LED and the tracking sensor, and decreasing the drive current to the first LED if the change in position of the LED-based tracking array decreased the distance between the first LED and the tracking sensor.

In some embodiments, increasing the drive current to the first LED includes generating, by a robotic device controller of the navigation station, one or more signals that direct a power module of the robotic device to increase a current output of a first variable current source, and transmitting the one or more signals to the power module, wherein an amount by which the current output of the first variable current source is increased is related to an amount by which the distance between the first LED and the tracking sensor has increased.

In some embodiments, increasing the current output of the first variable current source maintains the flux measured at the tracking sensor, due to the contribution of the first LED, nominally constant.

In some embodiments, decreasing the drive current to the first LED includes generating, by a robotic device controller of the navigation station, one or more signals that direct a power module of the robotic device to decrease a current output of a first variable current source, and transmitting the one or more signals to the power module, wherein an amount by which the current output of the first variable current source is decreased is related to an amount by which the distance between the first LED and the tracking sensor has decreased.

In some embodiments, decreasing the current output of the first variable current source maintains the flux at the tracking sensor, due to the contribution of the first LED, nominally constant.

BRIEF DESCRIPTION OF DRAWINGS

To facilitate a better understanding of various illustrative embodiments, reference is made to the accompanying drawings, wherein embodiments of a device for use in computer-aided surgery are shown.

To facilitate understanding, identical reference numerals have been used in some places to designate elements having substantially the same or similar structure and/or substantially the same or similar function.

DETAILED DESCRIPTION

Figure 1:
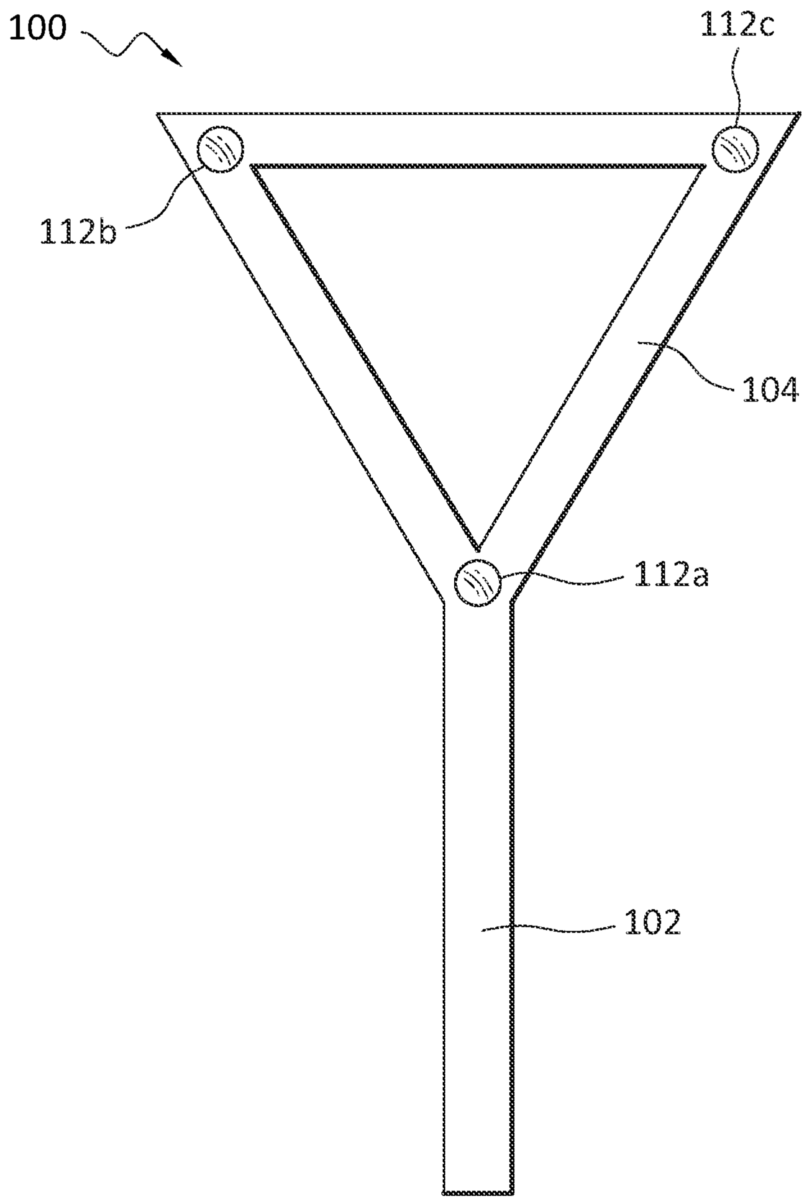
FIG. 1 shows an illustrative embodiment of an active illumination tracking array in accordance with this disclosure.

As described in greater detail below, computer-aided surgery may make use of a tracking system that includes tracking sensors to help identify the spatial relationships of various components of the surgical environment. Some of these tracking systems may utilize active light sources, such as but not limited to, light-emitting diodes (LEDs). As these LEDs are used for depth of field positional tracking, a closed loop system may be used to reduce the drive current for the LEDs that are relatively closer to the tracking sensors such that as robotic devices move through the surgical field, a nominally constant flux at a collecting sensor is maintained. By modulating the LED drive current based, at least in part, on the distance between an emitting LED and the tracking sensors, the effective lifetime of the LED may be increased. In other words, by reducing drive current used by LEDs, the effective lifetime of those LEDs may be increased. At the same time, power consumption and associated heat generation may be reduced. Additionally, this feature will reduce the number of light scatter artifacts (i.e., unintended reflections of signals from the light sources off of objects within the surgical environment that are picked up by the spatial camera and misinterpreted as a light source) which occur proportionately to the drive strength of light sources on tracked objects.

Various aspects of the disclosure are described more fully herein with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of, or combined with any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of this disclosure may be embodied by one or more elements of a claim.

Illustrative computer-aided surgery (CAS) systems are first described, including CAS systems that use active LED light sources on a tracked robotic device, followed by descriptions of varying, or modulating, the drive current supplied to those LEDS. Modulation of the LED drive currents may provide a nominally near-constant flux at the light-collecting sensors, and may extend the life of the LEDs by reducing LED degradation induced by drive currents over time. It is noted that extending the life of the LEDs may advantageously reduce the total cost of ownership of CAS systems by reducing the number of replacement parts needed and increasing the amount of time between failures.

Before computer-aided surgery (CAS) surgery takes place, the CAS system may learn the locations and relationships of various elements like medical instruments (e.g., scalpel, saw, drill, bone screw, implant, robot, etc.) and the patient (based optionally on images of the patient which might be obtained by a fluoroscopy, x-ray, CT, MRI, etc.) To enable the CAS to locate the patient, the patient typically has a navigation array attached somewhere on their body, often attached to a bone for stability. These navigation arrays can be monitored by a location device or system such as a spatial camera, one of which is commercially available from Northern Digital Inc. Spatial cameras typically use an internal coordinate system that is defined by the camera, not by the location of the patient (the spatial camera can be placed in various locations relative to the patient). The navigation arrays may be an array of reflective elements such as reflective spheres that reflect light back to the spatial camera (the spatial camera or other light source might emit infrared (IR) light and then sense the IR light reflected back from the reflective spheres using stereoscopic cameras, and thereby being able to spatially locate the reflective spheres).

Many surgeries use imaging devices (e.g., fluoroscope, x-ray, CT, MRI) that take images of the patient which can be helpful to the surgeon during surgery. Fiducials, such as radiopaque markers, can be attached to the patient before the imaging occurs. These fiducials make relatively well-defined landmarks in the image which can be used later to transform between the patient coordinate system and the camera coordinate system. The imaging devices typically have their own internal coordinate system that is defined by the imaging device itself and has no fixed relation to the coordinate system of the spatial camera (the camera can typically be placed in various locations relative to the imaging device).

Navigation arrays can also be attached to surgical instruments so that the CAS system can track the spatial location of the instrument. The spatial camera tracks the location of the navigation array, and thus the surgical instrument in the coordinate system of the camera. But it is only part of the picture for the spatial camera to know the location of the surgical instrument in the camera coordinate system. It is helpful for the CAS system to be able to know where the instrument is relative to the patient.

To accomplish this, various processes are used in setting up the CAS system before a surgery. One process is used to allow the CAS system to harmonize between the spatial camera coordinate system, the patient coordinate system, and/or the image device coordinate system—this process is typically called registration. In registration, the CAS system determines the relationship between the various coordinate systems. That is, if the CAS system knows the spatial relationship between navigation arrays connected to the patient (which are monitored by the spatial camera) and the fiducials connected to the patient (which show up in the images created by the imaging device), the CAS system can relate that information mathematically/spatially so that the image of the patient can be appropriately aligned with or overlaid onto the patient in 3D space. As an alternative to fiducials connected to the patient, for example, in imageless CAS systems, the CAS system prompts the surgeon to touch various anatomical landmarks on the patient with a navigated probe (or "pointer" as described in more detail below) to "teach" the CAS system the spatial location of the patient's anatomy.

The CAS system also needs to know the spatial relationship between the navigation array and the tip of the surgical instrument, as the tip is the part that may be altering the tissue of the patient. Another process is used to allow the CAS to obtain this relationship—this is typically called calibration. The term calibration may be used to describe the scenario in which the CAS system learns the distance or geometric relationship between the array and the tip of the tool, for example when the CAS system does not know the exact geometry of the surgical instrument. If the CAS system allows any length saw blade to be used, it can require the user to calibrate the tip of the blade. To accomplish this, the CAS system can use a "pointer" which is another surgical instrument with a pointed tip, a shaft, and a navigation array connected to the shaft such that the tip is located at a fixed location relative to the array. The CAS system is programmed to know this fixed geometric relationship and thus can use the pointer to obtain geometric points in 3D space, such as the tip of the saw blade (other points on the saw blade may be used such as divots on the saw blade that have a known relation to the tip of the saw blade) and can then deduce the relationship between the tip of the saw blade and the navigation arrays.

These processes harmonize the spatial relationships between the various elements of the CAS system. In this manner, the CAS system can know where the tip of the saw blade is relative to the patient, not just relative to the camera system, and images can be correlated to the actual position of the patient providing surgeons with information not available to the eye, such as the locations of bone or even nerves whose view is obstructed by the patient's skin.

FIG. 1 illustrates an embodiment of a tracking array 100. Tracking array 100 may include a mount 102 and a body 104. Mount 102 is connected to body 104 and provides a mounting structure. Mount 102 may facilitate connecting tracking array 100 to the patient, a tool, a robot, or any other item that needs to be tracked during the CAS. Mount 102 may also take any shape in order to facilitate the connection to the item to be tracked.

In this illustrative embodiment, one or more markers 112 may be attached to body 104. The example shown in FIG. 1 shows three markers 112, however alternative embodiments in accordance with this disclosure may have a different number of markers. It is noted that three markers are needed to define a plane. In accordance with this disclosure, the markers are active elements such as LEDs or other light-emitting sources. In this embodiment, markers 112 are attached to body 104 as illustrated. Markers 112 are tracked by the camera as described above. Markers 112 are shown as attached to body 104 near the corners of body 104. Body 104 is shown as having a triangular shape to accommodate the three markers 112. Body 104 may take on other shapes as well. Further, tracking array 100 may include more than three markers 112, and in such embodiments, body 104 may take other shapes to accommodate different numbers of markers. The use of three markers 112 is common because this is the minimum number of markers that define a plane that may be used to determine the location and orientation of tracking array 100 and hence the tracked item to which the array is attached. If more than three markers 112 are used, then they may or may not be coplanar depending upon the specific application.

As the camera system may see multiple arrays, the camera system needs to be able to group markers 112 for each tracking array 100 together. This may be accomplished by markers 112 for each tracking array 100 having unique physical locations and parameters. For example, the spacing between markers 112 may be unique for each tracking array 100. Further, the angles formed by markers 112 may also be used to differentiate between different tracking arrays 100. The camera records at least two different images of the surgical scene in order to determine the three-dimensional location of objects in the scene. The camera processes the received images to identify the different markers 112 that it sees. It then groups markers 112 that belong to the same tracking array 100. At this point the locations of tracking arrays 100 in the received images may be processed to determine the relative location of tracking arrays 100.

Since markers 112 are active elements, markers 112 for one tracking array at a time may be turned on, and, in this illustrative embodiment, the camera system will know which tracking array 100 it is viewing. Accordingly, the techniques described above for identifying specific tracking arrays may not be needed.

Figure 2:
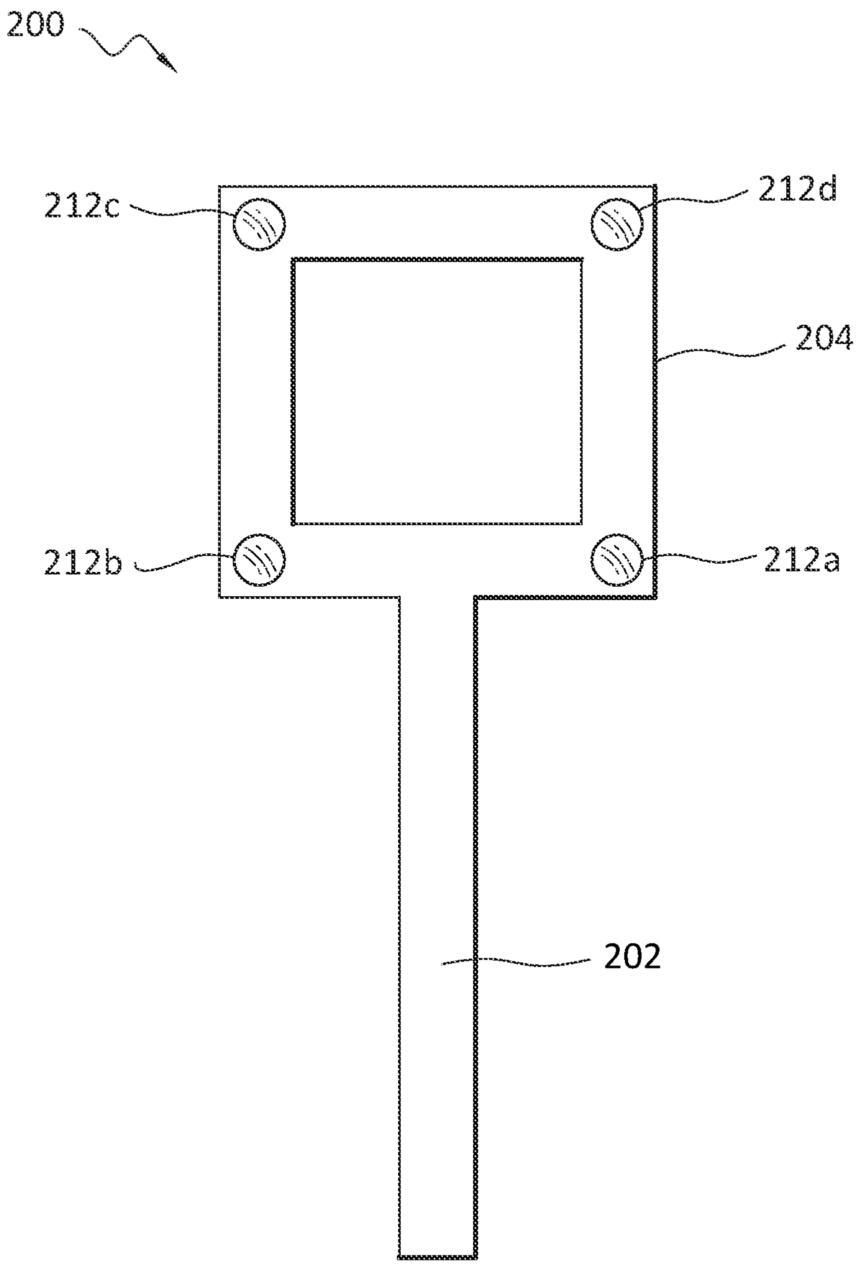
FIG. 2 shows another illustrative embodiment of an active illumination tracking array in accordance with this disclosure.

FIG. 2 illustrates an embodiment of an alternative tracking array 200. Tracking array 200 has a mount 202, a body 204, and markers 212*a*, 212*b*, 212*c*, and 212*d*. Body 204 of tracking array 200 has a rectangular shape (in contrast to the triangular shape of body 104 shown in FIG. 1). More than four markers may also be used in other embodiments. Body 204 may also have other shapes that accommodate the specific application of tracking array 200.

LEDs are widely used as illumination sources, and are commercially available in a range of output wavelengths. It is noted that various embodiments of this disclosure are not limited to any particular LED output wavelength or range of wavelengths. In some embodiments in accordance with this disclosure LEDs that output infrared (IR) light, for example light having wavelengths between about 800 nm and 980 nm are used. The amount of light output by an LED is related to the magnitude of the drive current through the LED. That is, more drive current produces more light and less drive current produces less light.

Various LEDs have many advantages as compared to traditional light sources, including but not limited to, greater efficiency and lower power consumption. However, LEDs have various wear mechanisms that lead to a degradation in their performance, if not outright failure, over time. The wear on LEDs due to drive current is referred to as "LED degradation," or "LED aging." Typically, this degradation occurs over time as an LED is subjected to electrical stress, primarily from the drive current passing through it. Various physical effects related to drive current may be factors that contribute to the performance degradation of an LED.

In one example of LED degradation due to high drive currents, the movement of atoms within semiconductor materials of an LED may lead to electromigration. This movement can cause structural defects and material displacement which may degrade the performance of an LED.

In another example of LED degradation due to high drive currents, accelerated ageing may be caused by the heat generation that results from high drive currents. In other words, higher drive currents lead to increased heat dissipation, which can accelerate degradation by causing thermal stress on the materials of an LED. Excessive heat may degrade the semiconductor junctions of the LED, thereby reducing the efficiency and light output of the LED.

In another example of LED degradation due to high drive currents, a reduction of an LED's quantum efficiency and luminous flux may occur over time. Higher drive currents increase the density of charge carriers injected into the active region of an LED, leading to increased recombination rates and non-radiative processes, which in turn may result in LED degradation.

Thus, reducing the drive current to an LED when the output of the LED is brighter than necessary for a particular application is desirable to reduce power consumption, reduce heating, and extend the lifetime of the LED.

It is noted that, in operation, the LEDs of an LED-based tracking array, without the benefit of embodiments in accordance with this disclosure, provide a nominally constant brightness (ignoring diminished brightness from long-term wear). However, the flux measured at the tracking sensor will vary as the LEDs move closer or farther away.

In various embodiments in accordance with this disclosure, the drive current provided to LEDs of an LED-based tracking array of a robotic device for computer-aided surgery is varied responsive to changes in the position of the LED-based tracking array relative to a tracking sensor. More particularly, as an LED is moved closer to the tracking sensor, its drive current is reduced, thereby reducing its brightness, reducing the amount of power consumed, reducing the amount of heat to be dissipated, and extending the life of the LED. Similarly, as the LED is moved farther away from the tracking sensor, its drive current may be increased, thereby increasing its brightness. In this way the flux measured at the tracking sensor is nominally constant.

Figure 3:
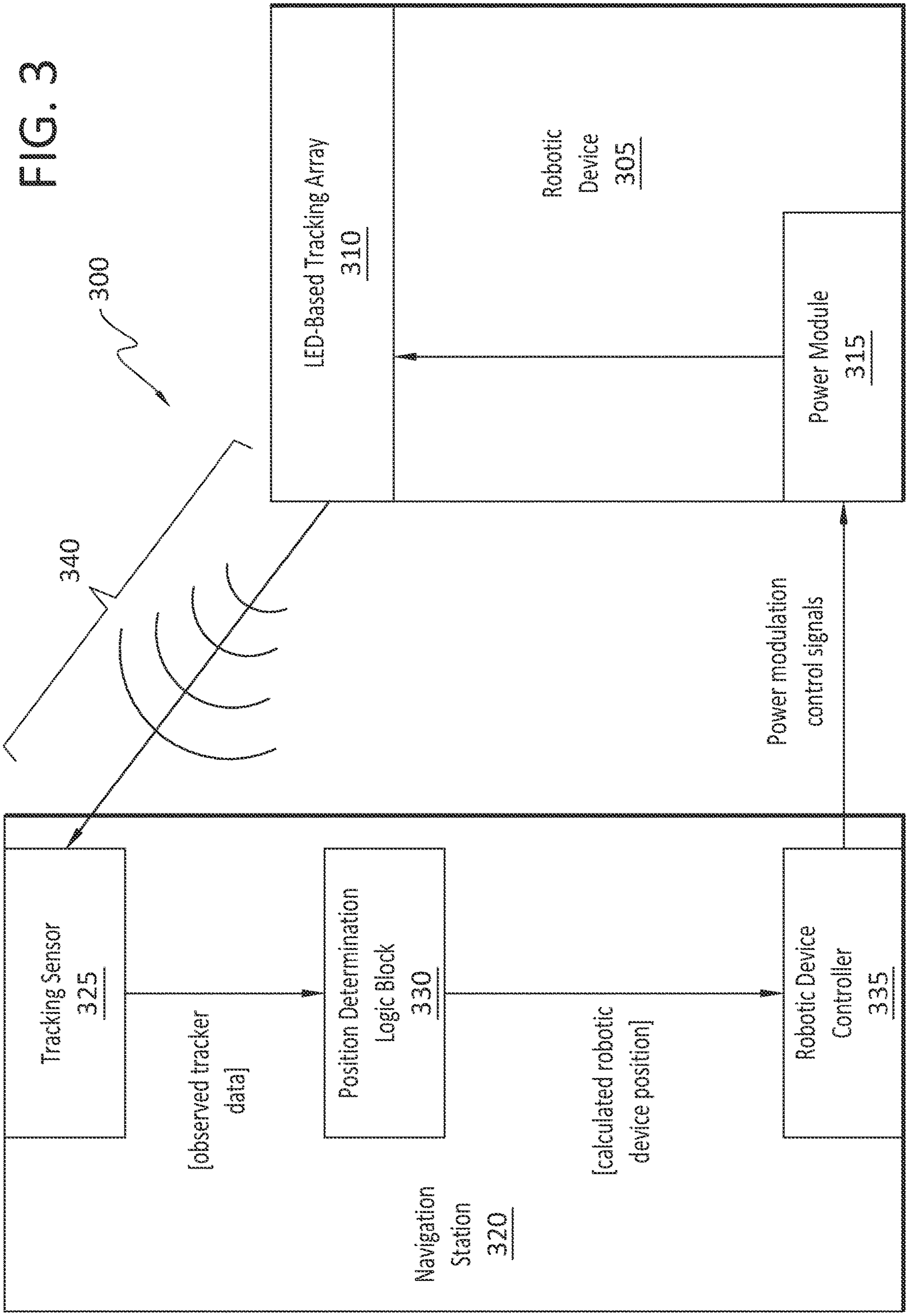
FIG. 3 is a high-level block diagram of an illustrative computer-aided surgery system in accordance with this disclosure.

FIG. 3 is a high-level block diagram of an illustrative computer-aided surgery system 300 in accordance with this disclosure. The illustrative computer-aided surgery system 300 shown in FIG. 3 includes a robotic device 305, which includes an LED-based tracking array 310, and a power module 315. Alternatively, "LED-based tracked feature" may be referred to herein as a "tracking array." LED-based tracking array 310 may be disposed on any portion of robotic device 305. For example, robotic device 305 may include portions such as, but not limited to, an arm, a joint of the arm, a portion of the arm, an end effector, a base, and so on; and an LED-based tracking array may be disposed on any such portion of robotic device 305. In other embodiments, two or more LED-based tracking arrays 310 may be disposed on a corresponding two or more portions of robotic device 305.

LED-based tracking array 310 may include one or more light-emitting devices such as but not limited to LEDs. LED-based tracking array 310 is coupled to power module 315, and each of the LEDs of LED-based tracking array 310 are configured to receive power from power module 315. In this illustrative embodiment, the one or more light-emitting devices are LEDs. Also, in this embodiment, power module 315 may control the magnitude of the drive current supplied to at least one of the one or more LEDs of LED-based tracking array 310.

Still referring to FIG. 3, the illustrative computer-aided surgery system 300 further includes a navigation station 320, which includes a tracking sensor 325, a position determination logic block 330, and a robotic device controller 335. Tracking sensor 325 is configured to detect at least some of the light 340 that is output by the one or more LEDs of LED-based tracking array 310. Tracking sensor 325 produces a digital representation of the light 340 that it has detected, and makes this digital representation (which may be referred to as observed tracker data) available to position determination logic block 330. Position determination logic block 330 is configured to calculate the position of robotic device 305 based on the observed tracker data. Robotic device controller 335 is configured to generate and transmit control signals to robotic device 305, including the generation and transmission of power modulation control signals to power module 315 of robotic device 305. In some embodiments, robotic device controller 335 may be configured transmit control signals to robotic device 305 wirelessly. In alternative embodiments, robotic device controller 335 may be configured transmit control signals to robotic device 305 by wired connection.

It is noted that in embodiments in which LED-based tracking array 310 uses a single LED, tracking sensor 325 may be a stereoscopic spatial camera.

In some embodiments, a source of power for power module 315 may be provided by batteries. In some embodiments, a source of power for power module 315 may be provided by wired connection to navigation station 320. In still other embodiments, a source of power for power module 315 is a connection to an AC mains outlet, and the corresponding AC to DC conversion circuitry. The power modulation control signals may be provided by wired or wireless connection to power module 315 from, for example, the navigation station 320.

Tracking sensor 325 may be a spatial camera. Position determination logic block 330 may be implemented by a computational resource or digital processing subsystem, such as one including a microprocessor, microcontroller, digital signal processor (DSP), graphics processing unit (GPU), application processor, field-programmable gate array (FPGA), application-specific integrated circuit (ASIC), system-on-chip (SoC) with or without chiplets, custom-designed discrete logic hardware, or similar devices or arrangements. Alternatively, “position determination logic block” may be referred to as a “processor” herein. Also, it is noted that position determination logic block 330 may be implemented with a one or more than one microprocessor, microcontroller, DSP, GPU, FPGA, ASIC, SoC, or any combination thereof.

Robotic device controller 335, like position determination logic block 330, may be implemented by a computational resource or digital processing subsystem, such as one including a microprocessor, microcontroller, DSP, GPU, application processor, FPGA, ASIC, SOC with or without chiplets, custom-designed discrete logic hardware, or similar devices or arrangements. In some embodiments, position determination logic block 330 and robotic device controller 335 share some or all of their hardware.

Figure 4A:
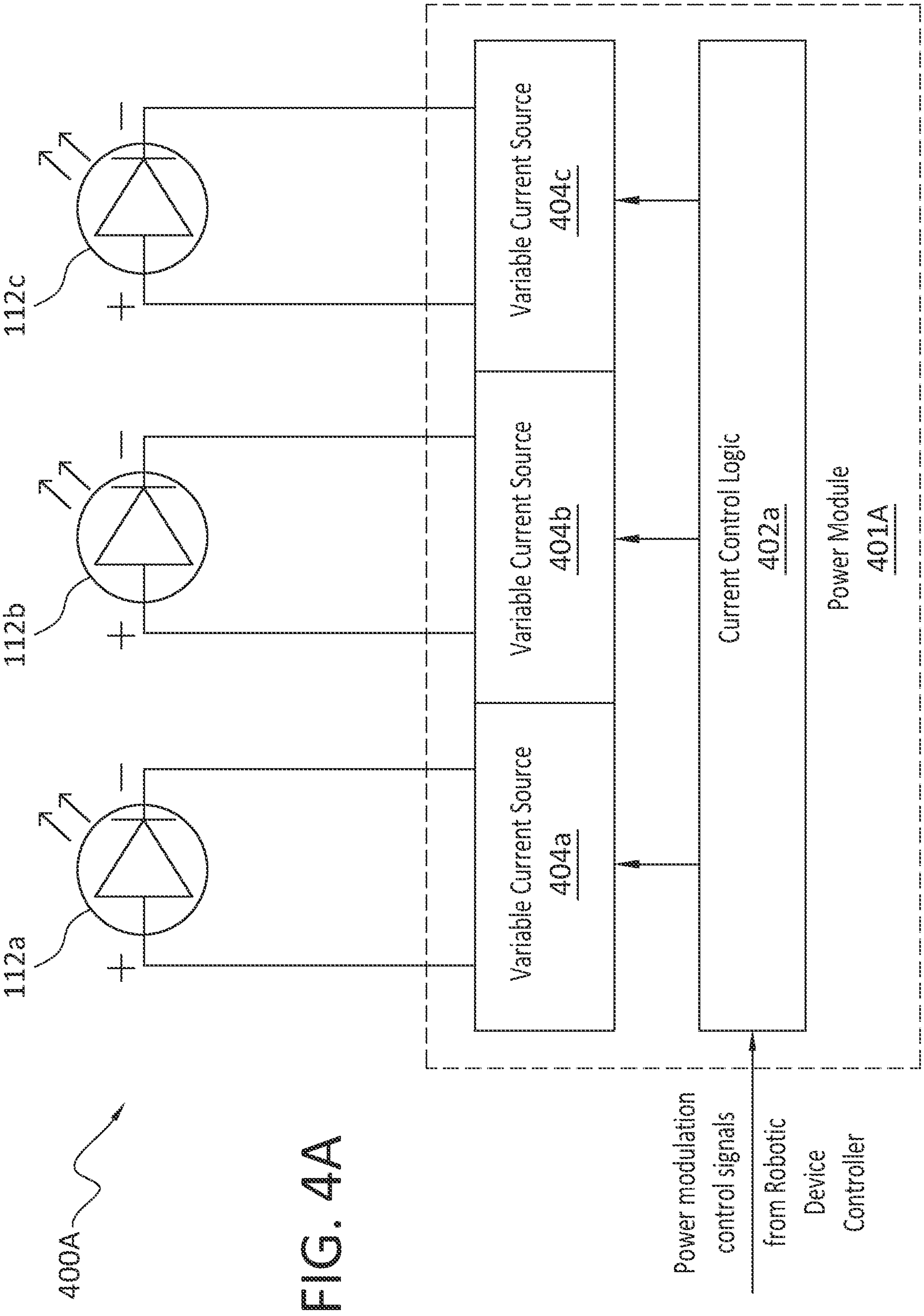
FIG. 4A is a schematic block diagram of an illustrative power module of a tracking array that controls the drive current to each of a plurality of LEDs independently.

FIG. 4A is a schematic block diagram of a robotic device 400A that includes an illustrative power module 401A for a tracking array, and which controls the drive current to each of a plurality of markers 112*a*, 112*b*, 112*c*, independently, where the markers are implemented as LEDs. Markers 112*a*, 112*b*, 112*c* may provide light output at any suitable wavelength or combination of wavelengths. In some embodiments, markers 112*a*, 112*b*, 112*c*, output light at infrared wavelengths. In this illustrative embodiment, power module 401A includes current-control logic 402*a*, and variable current sources 404*a*, 404*b*, 404*c*. Current-control logic 402*a* is coupled to provide signals to variable current sources 404*a*, 404*b*, 404*c*, where those signals control the magnitude of the drive current that current sources 404*a*, 404*b*, 404*c* provide, respectively, to markers 112*a*, 112*b*, 112*c*. Each variable current source 404*a*, 404*b*, 404*c*, may be controlled to output an amount of current that is nominally the same as, or different than the others of the variable current sources 404*a*, 404*b*, 404*c*.

Figure 4B:
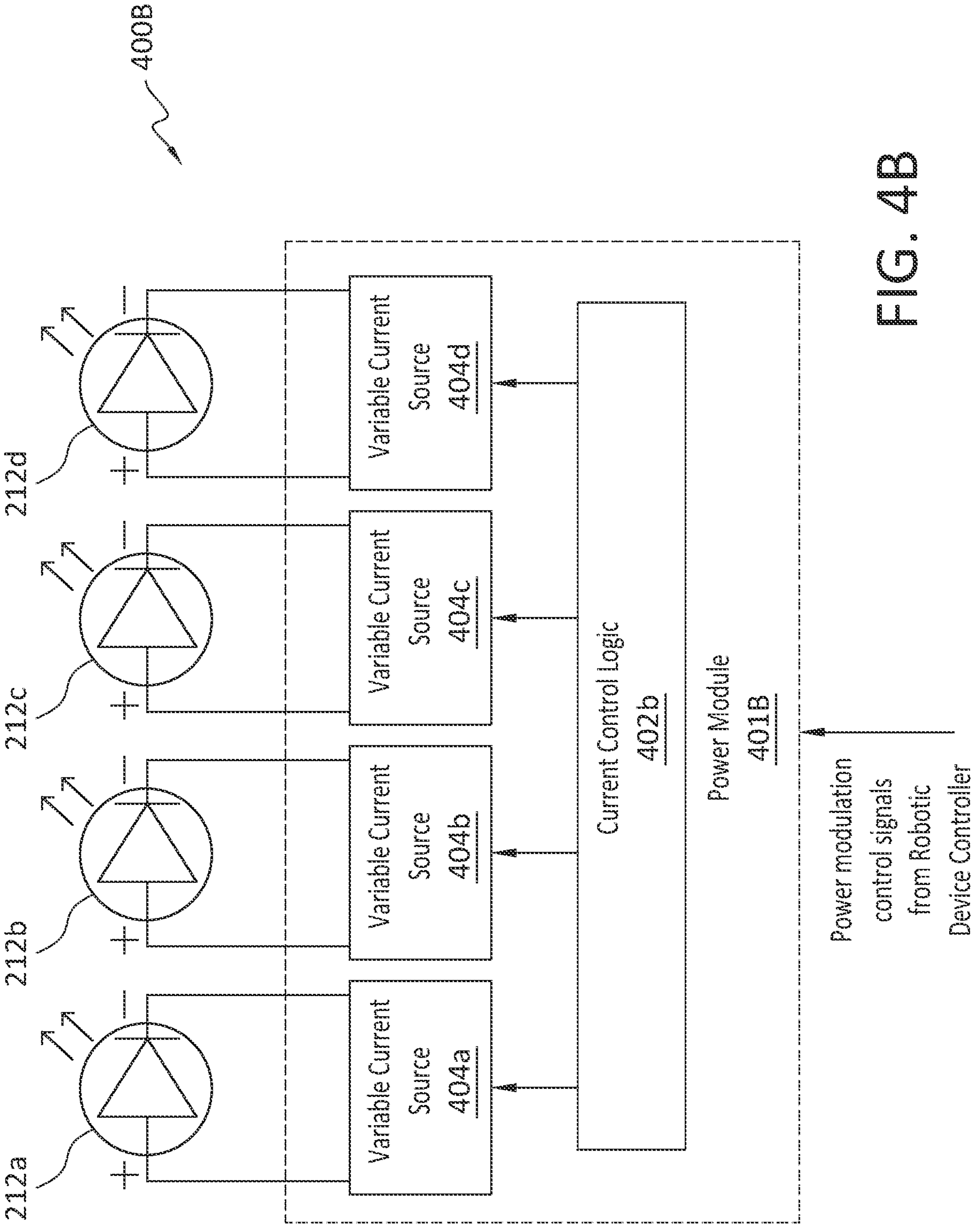
FIG. 4B is a schematic block diagram of an alternative illustrative power module of a tracking array that controls the drive current to each of a plurality of LEDs independently.

FIG. 4B is similar to FIG. 4A, but shows that variable drive current may be supplied to more markers than shown in FIG. 4A. FIG. 4B is a schematic block diagram of an alternative robotic device 400B that includes an illustrative power module 401B for a tracking array, and which controls the drive current to each of a plurality of markers 212*a*, 212*b*, 212*c*, 212*d* independently, where the markers are implemented as LEDs. Markers 212*a*, 212*b*, 212*c*, 212*d* may provide light output at any suitable wavelength or combination of wavelengths. In some embodiments, markers 212*a*, 212*b*, 212*c*, 212*d* output light at infrared wavelengths. In this illustrative embodiment, power module 401B includes current-control logic 402*b*, and variable current sources 404*a*, 404*b*, 404*c*, 404*d*. Current-control logic 402*b* is coupled to provide signals to current sources 404*a*, 404*b*, 404*c*, 404*d*, that control magnitude of the drive current that current sources 404*a*, 404*b*, 404*c*, 404*d*, provide, respectively, to markers 212*a*, 212*b*, 212*c*, 212*d*. Each variable current source 404*a*, 404*b*, 404*c*, 404*d*, may be controlled to output an amount of current that is nominally the same as, or different than the others of the variable current sources 404*a*, 404*b*, 404*c*, 404*d*.

Figure 5:
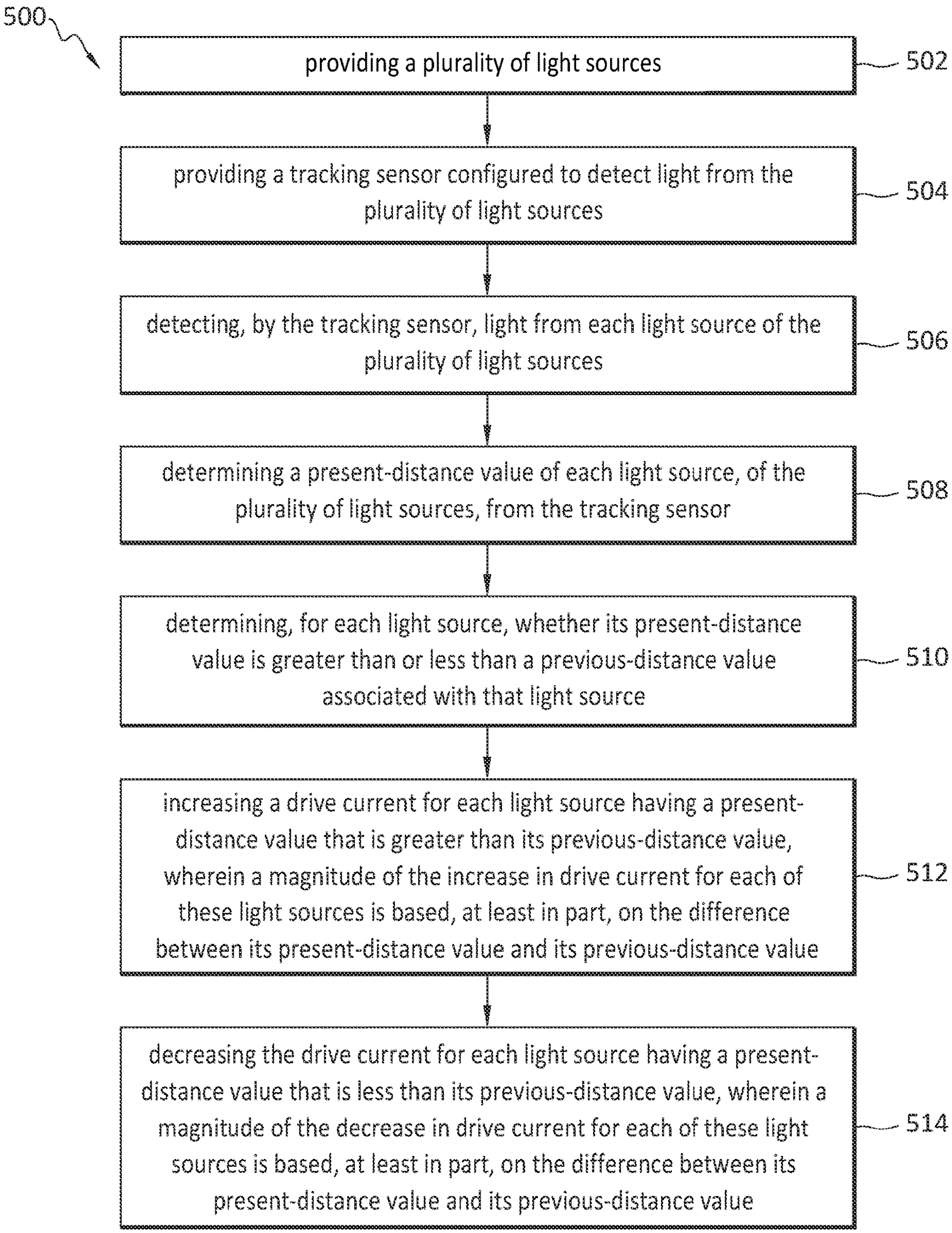
FIG. 5 is a flow diagram of a method in accordance with this disclosure.

FIG. 5 is a flow diagram of a method 500 for changing the drive current provided to a light source as the light source moves closer to, or farther away from, a tracking sensor. Method 500 includes providing 502 a plurality of light sources, and providing 504 a tracking sensor configured to detect light from the plurality of light sources. Method 500 further includes detecting 506, by the tracking sensor, light from each light source of the plurality of light sources, and determining 508 a present-distance value of each light source, of the plurality of light sources, from the tracking sensor. The distance value can represent an actual distance, such as inches, or it can represent distance relatively (and not necessarily linearly proportional) such that a higher number represents a larger distance. As such, an intensity level or other such light parameter might be used to represent distance. Method 500 continues by determining 510, for each light source, whether its present-distance value is greater than or less than a previous-distance value associated with that light source. Method 500 further includes increasing 512 a drive current for each light source having a present-distance value that is greater than its previous-distance value, wherein a magnitude of the increase in drive current for each of these light sources is based, at least in part, on the difference between its present-distance value and its previous-distance value. And, method 500 still further includes decreasing 514 the drive current for each light source having a present-distance value that is less than its previous-distance value, wherein a magnitude of the decrease in drive current for each of these light sources is based, at least in part, on the difference between its present-distance value and its previous-distance value.

Figure 6:
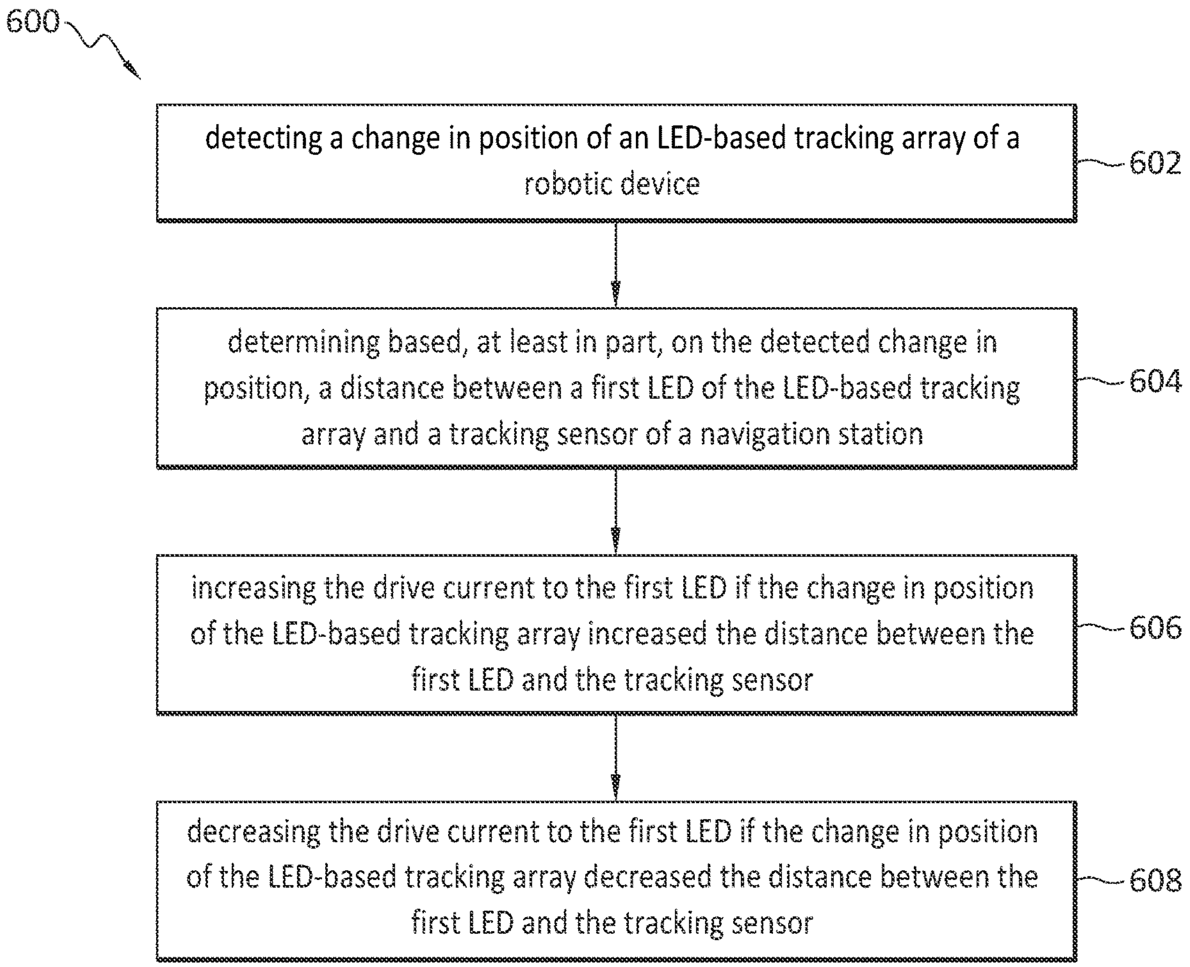
FIG. 6 is a flow diagram of a method in accordance with this disclosure.

FIG. 6 is a flow diagram of a method 600 for modulating drive current for an active illumination tracking array in a computer-aided surgery system. Method 600 includes detecting 602 a change in position of an LED-based tracking array of a robotic device. Method 600 further includes determining 604 based, at least in part, on the detected change in position, a distance between a first LED of the LED-based tracking array and a tracking sensor of a navigation station. And, method 600 further includes increasing 606 the drive current to the first LED if the change in position of the LED-based tracking array increased the distance between the first LED and the tracking sensor. Method 600 further includes decreasing 608 the drive current to the first LED if the change in position of the LED-based tracking array decreased the distance between the first LED and the tracking sensor.

Figure 7:
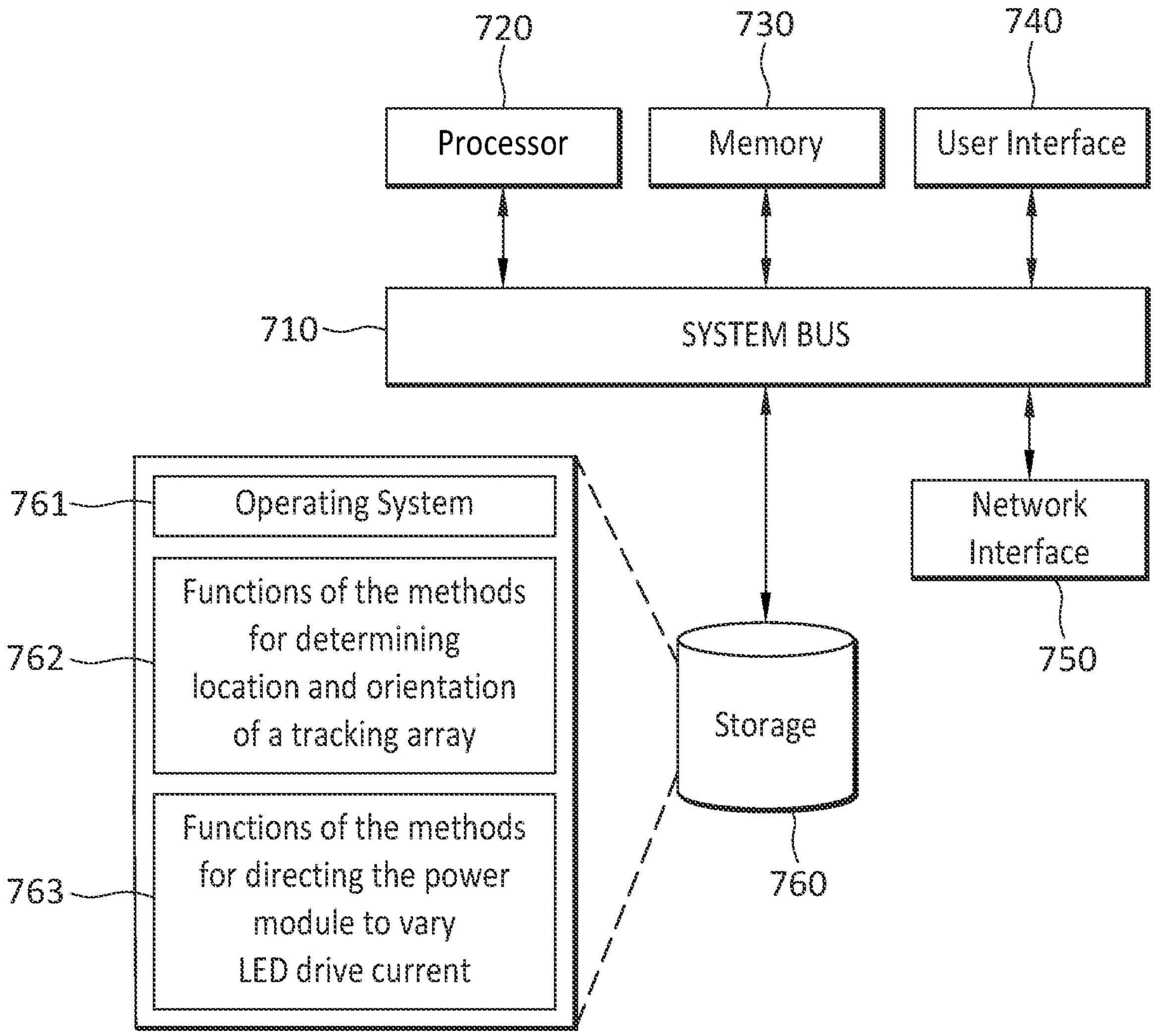
FIG. 7 is a block diagram of a computational resource for implementing various array tracking methods, and power modulation methods in accordance with this disclosure.

FIG. 7 shows an illustrative hardware diagram of a system 700 for implementing the array tracking methods and the power modulation methods 500 and 600 described herein. As shown, system 700 includes a processor 720, a memory 730, a user interface 740, a network interface 750, and a storage subsystem 760 communicatively coupled via one or more system buses 710. It will be understood that FIG. 7 constitutes, in some respects, an abstraction and that the actual organization of the components of system 700 may be more complex than illustrated.

Processor 720 may be any hardware device capable of executing instructions stored in memory 730 or storage subsystem 760, or otherwise processing data. As such, processor 720 may include a microprocessor, microcontroller, graphics processing unit (GPU), digital signal processor (DSP), neural network processor, field programmable gate array (FPGA), application-specific integrated circuit (ASIC), or other similar devices or combination of devices.

Memory 730 may include various memories such as, for example L1, L2, or L3 cache or system memory. As such, memory 730 may include static random-access memory (SRAM), dynamic RAM (DRAM), non-volatile memory (e.g., flash memory), read only memory (ROM), or other similar memory devices.

User interface 740 may include one or more devices for enabling communication with a user. For example, user interface 740 may include a display, a touch interface, a voice interface, a mouse, and/or a keyboard for receiving user commands. In some embodiments, user interface 740 may include a command line interface or graphical user interface that may be presented to a remote terminal via network interface 750.

Network interface 750 may include one or more devices for enabling communication with other hardware devices. For example, network interface 750 may include a network interface card (NIC) configured to communicate according to the Ethernet protocol or other communications protocols, including wireless protocols. Additionally, network interface 750 may implement a TCP/IP stack for communication according to the TCP/IP protocols. Various alternative or additional hardware or configurations for network interface 750 will be apparent.

Storage subsystem 760 may include one or more machine-readable storage media such as read-only memory (ROM), random-access memory (RAM), magnetic disk storage media, optical storage media, flash-memory devices, or similar storage media. In various embodiments, storage subsystem 760 may store instructions for execution by processor 720 or data upon which processor 720 may operate. For example, storage subsystem 760 may store a base operating system 761 for controlling various basic operations of system 700. Storage subsystem 760 may include storage 762 that includes software that implements the functions of the methods for determining the location and orientation of a tracking array in the CAS. Storage subsystem 760 may further include storage 763 that includes software that implements the power modulation control functions of methods 500 and 600, for varying the drive current of various active illumination sources on, for example, a tracking array.

Memory 730 and storage subsystem 760 may both be considered to be "non-transitory machine-readable media." As used herein, the term "non-transitory" will be understood to exclude transitory signals but to include all forms of storage, including both volatile and non-volatile memories.

System bus 710 allows communication between processor 720, memory 730, user interface 740, storage subsystem 760, and network interface 750.

System 700 is shown as including one of each described component, however, the various components may be duplicated in various embodiments. For example, processor 720 may include multiple microprocessors that are configured to independently execute the methods described herein or are configured to perform steps or subroutines of the methods described herein such that the multiple processors cooperate to achieve the functionality described herein. Further, where system 700 is implemented in a cloud computing system, the various hardware components may belong to separate physical systems. For example, processor 720 may include a first processor in a first server and a second processor in a second server.

The foregoing disclosure provides illustration and description, but is not intended to be exhaustive or to limit the aspects to the precise form disclosed. Modifications and variations may be made in view of the above disclosure or may be acquired from practice of the aspects.

Unless stated otherwise, terms such as "first" and "second" are used to arbitrarily distinguish between the elements such terms describe. Thus, these terms are not necessarily intended to indicate temporal or other prioritization of such elements.

It should be readily understood that the meaning of "on," "above," and "over" in the present disclosure should be interpreted in the broadest manner such that "on" not only means "directly on" something but also includes the meaning of "on" something with an intermediate feature or a layer therebetween, and that "above" or "over" not only means the meaning of "above" or "over" something but can also include the meaning it is "above" or "over" something with no intermediate feature or layer therebetween (i.e., directly on something).

Further, spatially relative terms, such as "beneath," "below," "lower," "above," "upper," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (e.g., rotated 90 degrees or at other orientations) and the spatially relative descriptors used herein may likewise be interpreted accordingly.

Modifications and variations may be made in light of the above disclosure or may be acquired from practice of the aspects.

As used herein, the term "vertical/vertically" means nominally orthogonal to the surface of the object being referenced.

As used herein, the term "nominal/nominally" refers to a desired, or target, value of a characteristic or parameter for a component or a process operation, set during the design phase of a product or a process, together with a range of values above and/or below the desired value. The range of values can be due to slight variations in manufacturing processes or tolerances.

As used herein, the term "about" indicates the value of a given quantity may vary from its nominal value based on, for example, various manufacturing tolerances. By way of example and not limitation, the term "about" may indicate the cited value of a given quantity may vary within, for example, 1-30% of the value (e.g., ±0.5%, ±1%, ±5%, ±10%, ±20%, or ±30% of the value). Specific ranges are provided herein as needed.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles “a” and “an” are intended to include one or more items, and may be used interchangeably with “one or more.” Furthermore, as used herein, the terms “set” and “group” are intended to include one or more items (e.g., related items, unrelated items, a combination of related and unrelated items, and/or the like), and may be used interchangeably with “one or more.” Where only one item is intended, the phrase “only one” or similar language is used. Also, as used herein, the terms “has,” “have,” “having,” and/or the like are intended to be open-ended terms. Further, the phrase “based on” is intended to mean “based, at least in part, on” unless explicitly stated otherwise.

Although the various illustrative embodiments have been described in detail with particular reference to certain exemplary aspects thereof, it should be understood that the invention is capable of other embodiments and its details are capable of modifications in various obvious respects. As is readily apparent to those skilled in the art, variations and modifications and combinations of the various embodiments can be affected while remaining within the spirit and scope of the invention. Accordingly, the foregoing disclosure, description, and figures are for illustrative purposes only and do not in any way limit the invention, which is defined only by the subjacent claims.

What is claimed is:

1. A tracking array tracking system, comprising:

a navigation station comprising:

a tracking sensor; and a position determination logic block coupled to the tracking sensor;

a robotic device comprising:

a tracking array including one or more markers; and a power module coupled to the tracking array, the power module including one or more variable current sources; and a robotic device controller coupled to the position determination logic block, wherein the robotic device controller is communicatively coupled to the power module of the robotic device, the one or more markers are coupled to the corresponding one or more variable current sources, the power module further includes current-control logic coupled to the one or more variable current sources, and the current-control logic is configured to control, responsive to power modulation control signals received from the robotic device controller, an amount of drive current that is output by each variable current source of the one or more variable current sources.

2. The tracking array tracking system of claim 1, wherein the amount of drive current that is output by each variable current source is based, at least in part, on a distance of each corresponding marker from the tracking sensor.

3. The tracking array tracking system of claim 2, wherein the one or more markers comprises a corresponding plurality of light-emitting diodes (LEDs), and the brightness of each LED is related to the amount of drive current provided to each LED respectively.

4. The tracking array tracking system of claim 3, wherein the tracking array comprises:

a mount; and a body coupled to the mount, wherein the body has a triangular shape.

5. The tracking array tracking system of claim 4, wherein a first portion of the plurality of LEDs and a second portion of the plurality of LEDs are infrared LEDs.

6. The tracking array tracking system of claim 3, wherein the tracking array comprises:

a mount; and a body coupled to the mount, wherein the body has a rectangular shape.

7. The tracking array tracking system of claim 6, wherein the tracking sensor comprises a spatial camera.

8. The tracking array tracking system of claim 2, wherein the position determination logic block is configured to provide the position of the robotic device to the robotic device controller based, at least in part, on a plurality of stored observations by the tracking sensor of light emitted by the tracking array.

9. The tracking array tracking system of claim 8, wherein the position determination logic block comprises a processor.

10. The tracking array tracking system of claim 9, wherein the robotic device controller is configured to share the processor with the position determination logic block.

* * * * *